(12) United States Patent
Srinidhi (10) Patent No.: US 7,856,147 B2
(45) Date of Patent: Dec. 21, 2010

(54) METHOD AND APPARATUS FOR PROCESSING A COMPRESSED IMAGE IN AN ORDER OTHER THAN THE ORDER OF WHICH IT WAS COMPRESSED

(75) Inventor: Kadagattur Srinidhi, Acton, MA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 12/623,634

(22) Filed: Nov. 23, 2009

(65) Prior Publication Data

US 2010/0296747 A1    Nov. 25, 2010

Related U.S. Application Data

(62) Division of application No. 11/028,488, filed on Dec. 31, 2004, now Pat. No. 7,643,694.

(51) Int. Cl.
*G06K 9/36* (2006.01)
*G06K 9/46* (2006.01)

(52) U.S. Cl. .................. 382/235; 382/250; 382/233; 382/296

(58) Field of Classification Search .......... 382/232, 382/233, 235, 242, 244, 250
See application file for complete search history.

(56) References Cited

U.S. PATENT DOCUMENTS

| | | | |
|---|---|---|---|
| 5,327,248 A * | 7/1994 | Miller et al. ................. 382/233 |
| 5,408,328 A * | 4/1995 | Boliek et al. ................. 382/233 |
| 5,751,865 A | 5/1998 | Micco et al. |
| 5,838,831 A | 11/1998 | de Queiroz |
| 5,867,598 A | 2/1999 | de Queiroz |
| 5,986,672 A | 11/1999 | Groezinger et al. |
| 6,175,653 B1 | 1/2001 | de Queiroz |
| 6,271,929 B1 | 8/2001 | Zhao |
| 6,292,619 B1 * | 9/2001 | Fujita et al. ................. 386/52 |
| 6,298,166 B1 * | 10/2001 | Ratnakar et al. ............ 382/248 |
| 6,553,150 B1 * | 4/2003 | Wee et al. ................... 382/243 |

(Continued)

FOREIGN PATENT DOCUMENTS

EP    0947954 A    10/1999

(Continued)

OTHER PUBLICATIONS

European Search Report for corresponding Application No. 05855007.0 dated Aug. 28, 2008.

(Continued)

*Primary Examiner*—Bhavesh M Mehta
*Assistant Examiner*—Mia M Thomas
(74) *Attorney, Agent, or Firm*—Lando & Anastasi, LLP (57) ABSTRACT

An image processing system that can receive compressed image data corresponding to a representation of an image and process that image data in an order that is independent of the order in which that image data was compressed. A first pass decoding identifies certain information pertaining to the coded units within the compressed image data. Based upon that information, the coded units in the compressed image data may be decoded in an order that is different than the order in which they were encoded, and portions of the image may be rotated by a multiple of 90° independently of other portions of the image, thereby reducing the amount of memory needed to decompress and rotate the compressed image data.

7 Claims, 6 Drawing Sheets

U.S. PATENT DOCUMENTS

| | | | |
|---|---|---|---|
| 6,577,311 B1* | 6/2003 | Crosby et al. | 345/428 |
| 6,600,869 B1* | 7/2003 | Chen et al. | 386/52 |
| 6,640,019 B2* | 10/2003 | Kosugi et al. | 382/299 |
| 6,700,932 B2* | 3/2004 | Shen et al. | 375/240.12 |
| 6,802,037 B2 | 10/2004 | Kim et al. | |
| 6,836,564 B2 | 12/2004 | Katayama et al. | |
| 6,941,019 B1 | 9/2005 | Mitchell et al. | |
| 7,050,645 B2* | 5/2006 | Sato et al. | 382/250 |
| 7,068,846 B1* | 6/2006 | Yaguchi | 382/232 |
| 7,079,690 B2* | 7/2006 | Boliek et al. | 382/232 |
| 7,099,387 B2 | 8/2006 | Bjontegaard et al. | |
| 7,280,692 B2* | 10/2007 | Fushiki et al. | 382/167 |
| 7,391,913 B2* | 6/2008 | Mao et al. | 382/233 |
| 7,440,625 B2* | 10/2008 | Spampinato | 382/232 |
| 7,447,366 B2* | 11/2008 | Chuang et al. | 382/233 |
| 7,738,718 B2* | 6/2010 | Chang et al. | 382/250 |
| 2001/0016075 A1* | 8/2001 | Klassen | 382/233 |
| 2001/0043747 A1 | 11/2001 | Inuzuka et al. | |
| 2002/0018238 A1 | 2/2002 | Hirano | |
| 2002/0085767 A1* | 7/2002 | Epstein et al. | 382/246 |
| 2002/0136294 A1* | 9/2002 | Culbert | 375/240.02 |
| 2002/0181788 A1* | 12/2002 | Kosugi et al. | 382/233 |
| 2003/0086597 A1 | 5/2003 | Ohta et al. | |
| 2004/0218820 A1 | 11/2004 | Mitchell et al. | |
| 2005/0008236 A1* | 1/2005 | Hachiyama et al. | 382/233 |
| 2005/0117809 A1 | 6/2005 | Mitchell et al. | |
| 2005/0249423 A1 | 11/2005 | Huang et al. | |
| 2005/0254715 A1 | 11/2005 | Keng et al. | |

FOREIGN PATENT DOCUMENTS

EP         0947954 A1 * 10/1999

OTHER PUBLICATIONS

International Search Report for corresponding Application No. PCT/US2005/046377 dated May 12, 2005.

Regalia et al., Iterative Decoding of Concatenated Codes: A Tutorial; EURASIP Journal on Applied Signal Processing 2005:6, pp. 762-774.

* cited by examiner

|  |  |  |  |  |  |  |  |
|---|---|---|---|---|---|---|---|
| 11 | 12 | 13 | 14 | 15 | 16 | 17 | 18 |
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |
| 51 | 52 | 53 | 54 | 55 | 56 | 57 | 58 |
| 61 | 62 | 63 | 64 | 65 | 66 | 67 | 68 |

FIG. 3

|  |  |  |  |  |  |
|---|---|---|---|---|---|
| 61 | 51 | 41 | 31 | 21 | 11 |
| 62 | 52 | 42 | 32 | 22 | 12 |
| 63 | 53 | 43 | 33 | 23 | 13 |
| 64 | 54 | 44 | 34 | 24 | 14 |
| 65 | 55 | 45 | 35 | 25 | 15 |
| 66 | 56 | 46 | 36 | 26 | 16 |
| 67 | 57 | 47 | 37 | 27 | 17 |
| 68 | 58 | 48 | 38 | 28 | 18 |

METHOD AND APPARATUS FOR PROCESSING A COMPRESSED IMAGE IN AN ORDER OTHER THAN THE ORDER OF WHICH IT WAS COMPRESSED

RELATED APPLICATION

This application is a division under 35 U.S.C. §120 of U.S. patent application Ser. No. 11/028,488, filed Dec. 31, 2004, entitled METHOD AND APPARATUS FOR PROCESSING A COMPRESSED IMAGE IN AN ORDER OTHER THAN THE ORDER IN WHICH IT WAS COMPRESSED, which is herein incorporated by reference in its entirety.

BACKGROUND

1. Field of Invention

Aspects of the present invention are directed to the processing of compressed digital images, and more particularly to the processing of a compressed digital image in an order that is different than the order in which it was compressed, for example, to rotate the compressed digital image.

2. Discussion of Related Art

The compression and decompression of digital images is well known, as evidenced, for example, by the widespread acceptance of the JPEG (Joint Photographic Experts Group) standard. The JPEG standard is described in numerous publications, such as the JPEG Still Image Data Compression Standard, by W. Pennebaker and J. Mitchell, 1993 (Van Nostrand Reinhold, N.Y.), and thus details of the JPEG standard are described only briefly herein.

In accordance with a baseline mode of operation defined in the JPEG standard, digitally sampled component values of portions of an image are transformed into a frequency domain representation using a DCT (Discrete Cosine Transform). The resultant coefficient values (organized in 8 by 8 "blocks") for each of the components (e.g., luminance, chrominance) are then quantized (i.e., divided) by a quantization value, and the quantized coefficient values are encoded using an entropy encoding process (either Huffman encoding or arithmetic encoding) to produce a JPEG compressed data stream. In the sequential DCT mode of operation, the quantized coefficient values for the components are separately encoded either individually, or in groups, in a single pass or scan in what are termed Minimum Coded Units (MCUs). In scans in which the quantized coefficient values are encoded in groups (e.g., in which the quantized coefficient values for more than one component are encoded in a single MCU), the MCU defines the manner in which the components are interleaved.

To decompress a JPEG compressed data stream, the process is essentially the reverse of the compression process. First, the MCUs of the compressed data stream are decoded in an entropy decoder; then the quantized coefficient values for the components of each MCU are dequantized (i.e., multiplied) by the appropriate quantization value used during compression, and the dequantized coefficient values are then transformed into the spatial domain using an IDCT (Inverse Discrete Cosine Transform). The decompressed spatial domain data is then typically stored, at least temporarily, in a memory, where it may then be provided to a display device, such as video or television monitor, a printer or copier, etc.

As well known to those skilled in the art, during compression, sampled portions of the image are processed in a particular order or sequence; namely from left to right and from top to bottom. The blocks or arrays of component values for each of the sampled portions are transformed into the frequency domain in a similar manner. Further, the value of the DC coefficient for each component of an MCU (except for the first MCU) is expressed as a difference between the value of DC coefficient of the current component block and that of the immediately preceding component block. Because compressed images are compressed in a particular sequential order, and the values of certain coefficients of one component block are differentially encoded relative to those of a preceding block, most image decompression systems and processes decompress the compressed image in the same sequential order in which it was compressed.

In many instances it may be desired to display a previously compressed image in viewable form (e.g., projected on a display screen such as that of a television or video monitor, a PDA or cell phone screen, or printed or copied in hardcopy form, etc.) in its original orientation. However, in other instances, it may be desired that the previously compressed image be displayed in an orientation other than its original orientation. For example, images are frequently rotated by a multiple of 90° (i.e., 90°, 180°, 270° (or alternatively −90°)), whether to accommodate the capabilities of the display device (e.g., to accommodate the dimensions of a display screen or a hardcopy medium on which the image is rendered), to accommodate the desires of the viewer, or for other reasons.

U.S. Pat. Nos. 5,751,865, 5,867,598, and 6,175,653, which are incorporated herein by reference in their entirety, describe various aspects relating to the compression, decompression, and/or rotation of images. The '865 patent describes how a rotation operation may be combined with a block-wise compression operation so as to produce rotated and compressed data that may be decompressed and sent to a display device to obtain a rotated image. In the '865 patent, the blocks of spatial data are rotated prior to being compressed in accordance with the JPEG standard. The '598 patent describes an alternative technique wherein the coded units (i.e., MCUs) of a JPEG compressed image corresponding to a first orientation of the image may be only partially decoded and then rotated in the transform (e.g., frequency) domain without fully decompressing the coded units. In the '598 patent, quantized coefficient matrices of a component are rotated in the transform domain and then entropy re-encoded. The entropy re-encoded data may be re-ordered to accomplish interblock rotation. The '653 patent describes the rotation and scaling of a compressed image for output to a display device having an asymmetric resolution. In the '653 patent, the coded units of a compressed image corresponding to a first orientation of the image are partially decoded, and then rotated and scaled in the transform domain. The rotated and scaled coded units are then fully decompressed, and the spatial data is placed in an appropriate location in an output buffer to achieve interblock rotation.

SUMMARY OF INVENTION

Embodiments of the present invention permit the processing of a compressed image to be performed in an order that is independent of the order in which the image was compressed. In particular, in any image compression process wherein a first portion of compressed image data corresponding to a first portion of the compressed image is based upon (e.g., predicted from) compressed image data corresponding to another portion of the compressed image, embodiments of the present invention permit the first portion of the image to be processed independently of the compressed image data corresponding to the other portion of the compressed image upon which it is based.

According to one aspect of the present invention, a method of processing compressed data corresponding to a representation of an image is provided. The compressed data includes a plurality of coded units encoded in a first sequential order, and the method comprises an act of iteratively decoding subsets of the plurality of coded units in a second sequential order that is different than the first sequential order. In accordance with one embodiment, the first sequential order may correspond to a first representation of the image in a first orientation and the second sequential order may correspond to a second representation of the image in a second orientation that is rotated by a multiple of ninety degrees relative to the first orientation.

According to another aspect of the present invention, a computer readable medium is provided. The computer readable medium is encoded with a program that, when executed on a processor of an image processing system, performs a method comprising acts of receiving compressed data that includes a plurality of coded units encoded in a first sequential order and which corresponds to a representation of an image, and iteratively decoding subsets of the plurality of coded units in a second sequential order that is different than the first sequential order. In accordance with one embodiment, the first sequential order corresponds to a first representation of the image in a first orientation, and the second sequential order generally corresponds to an order in which decompressed spatial data corresponding to the compressed data is to be provided to a display device to display a second representation of the image in a second orientation that is rotated by a multiple of ninety degrees relative to the first orientation.

According to yet another aspect of the present invention, an image processing system is provided. The image processing system comprises a first memory region to store compressed data that includes a plurality of coded units encoded in a first sequential order and which corresponds to a representation of an image in a first orientation, and a processor, operatively coupled to the first memory region, to decode the plurality of coded units in a second sequential order that is different than the first sequential order. In accordance with one to embodiment, the image processing system may further comprise a second memory region that is operatively coupled to the processor and which stores first information identifying a location at which each respective Nth coded unit of the plurality of coded units is stored in the first memory region.

According to yet another aspect of the present invention, an apparatus for use in an image processing system is provided. The image processing system includes a memory in which compressed data corresponding to a representation of an image is stored, the compressed data including a plurality of coded units. The apparatus comprises a buffer, and a processor, operatively coupled to the buffer, and adapted to receive each of the plurality of coded units, decode each of the plurality of coded units, and for each respective Nth coded unit of the plurality of coded units, to store first information in the buffer that identifies a location in the memory of the image processing system in which the respective Nth coded unit is stored. In accordance with one embodiment, and where each of the plurality of coded units includes quantized DCT coefficient data corresponding to a plurality of components of the image, the processor may be further adapted to store, for each respective Nth coded unit of the plurality of coded units, second information in the buffer that identifies a value of each DC DCT coefficient in the quantized DCT coefficient data of the respective Nth coded unit that corresponds to a distinct component of the plurality of components of the image.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As used herein, the term "data" refers to physical signals that indicate or include information. The term "data" includes data existing in any physical form, and includes data that are transitory or are being stored or transmitted. For example, data may exist as electromagnetic or other transmitted signals or as signals stored in electronic, magnetic, or other form.

An "image" is a pattern of physical light. An image may include characters, words, pictures, and text, as well as other features such as graphics. An image may be divided into "segments," each of which is itself an image. A segment of an image may be of any size up to and including the whole image.

A "memory" is a physical medium that can store data. Examples of memories include magnetic media such as diskettes, floppy disks, and tape; optical media such Magneto-Optic disks, CDs, and DVDs; and semiconductor media such as semiconductor ROMs, RAMs, etc.

As used herein, the term "encoding" refers to an entropy encoding process, such as Huffman or arithmetic encoding, and the term "decoding" refers to an entropy decoding process, such as Huffman or arithmetic decoding.

As used herein, and as applied to a JPEG compressed image, the term "decompressing" refers to the process of decoding, inverse quantizing, and inverse discrete cosine transforming a JPEG compressed image data to provide spatial data.

A display device refers to a device that can receive an item of data defining a representation of an image and provide the representation of the image as output in human viewable form. Examples of display devices include hardcopy display devices such as printers and copiers, screen display devices such as televisions, computer monitors, PDA or cell phone screens, projection display devices, etc.

Because certain aspects of JPEG compression and decompression may involve the loss of some information, the expression "representation of an image" is used herein to indicate that although the decompressed spatial data provided to a display device corresponds to the JPEG compressed image data from which it was obtained, the viewable output of the display device may not be identical to the original image.

In broad overview, embodiments of the present invention permit the processing of a compressed image to be performed in an order that is independent of the order in which the image was compressed. In particular, in any image compression process, such as for example JPEG compression, MPEG (Motion Picture Experts Group) compression, etc. wherein a first portion of compressed image data corresponding to a first portion of the compressed image is based upon (e.g., predicted from) compressed image data corresponding to another portion of the compressed image, embodiments of the present invention permit the first portion of the image to be processed independently of the compressed image data corresponding to the other portion of the compressed image upon which it is based. This ability to process one portion of the compressed image data independently of another may be used, for example, to incrementally decompress and rotate portions of the compressed image as described in detail herein, or for other purposes, such as for example, to compare spectral components of one portion of the image to another.

In accordance with one aspect of Applicant's invention, various embodiments are directed to a method and apparatus for decompressing JPEG compressed data that corresponds to a representation of an image in a first orientation to provide a spatial representation of the image in a second orientation that is rotated by 90° relative to the first orientation. Advantageously, and in accordance with one aspect of Applicant's invention, the decompression may be performed in an amount of memory that is substantially less than the amount of memory that would be required to rotate the spatial representation of the image by a multiple of 90° after decompression. Embodiments of this aspect of the present invention may be used with different types of compressed JPEG images, including binary images, grayscale images, and color images, and with different types of encoding (e.g., Huffman encoding or arithmetic encoding).

Figure 1:
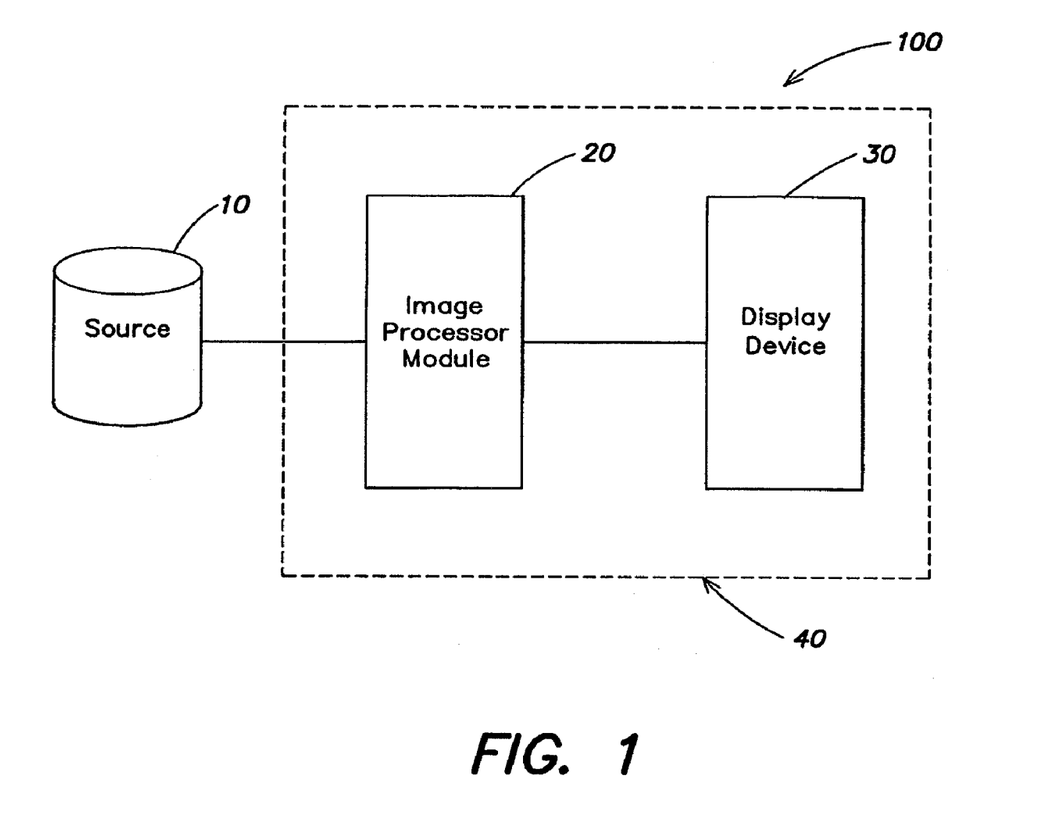
FIG. 1 is a block diagram representation of an image processing system that includes an image processor module in accordance with one embodiment of the present invention.

FIG. 1 is a block diagram representation of an image processing system in accordance with one aspect of Applicant's invention that can receive JPEG compressed data corresponding to a representation of an image in a first orientation and provide a spatial representation of the image in a second orientation that is rotated by 90° relative to the first orientation. As illustrated, the image processing system 100 includes an image processor module 20 to receive JPEG compressed data from a source 10 and a display device 30 operatively connected to the image processor module 20.

The source 10 of JPEG compressed data may include any source capable of providing JPEG compressed data, including a file stored on a computer readable medium such as a disk drive of a computer (not shown), a diskette, a memory stick, a CD, or a DVD that can store JPEG compressed data, or alternatively, the source 10 may be a physical device, such as a digital camera or scanner that can provide JPEG compressed data. In one embodiment, the image processor module 20 and the display device 30 may be included in a single device 40, such as a printer, a copier, a computer, a PDA, a cell phone, etc. Alternatively, the image processor module 20 may be a standalone device that may be operatively connected to an external output device 30, such as a raster printer (e.g., a printer that includes no interpreter or PDL (Page Description Language) controller that receives a formatted bitstream of spatial data for display), a projection display, etc. Although the source 10 is depicted as being separate from the device 40, it should be appreciated that in certain devices, such as copiers, the source 10 of JPEG compressed data may be resident within the device 40 itself.

The image processor module 20 receives JPEG compressed image data corresponding to a representation of an image in a first orientation and incrementally decompresses and rotates the JPEG compressed image data to provide rotated spatial data that may be provided to the display device 30 to form a representation of the image in a second orientation that is rotated, relative to the first orientation, by a multiple of 90°. According to one aspect of the present invention, the image processor module performs rotation of the image in the transform domain and need not decode all the JPEG compressed image data prior to performing that rotation. According to another aspect of the present invention, the image processor module decompresses the JPEG compressed image data in an order that is different than the order in which it was compressed. In this regard, rather than decompressing the JPEG compressed image data in the sequential order in which it was compressed and which corresponds to the first orientation, embodiments of Applicant's invention decompress the JPEG compressed image in the order in which the spatial data is to be provided to a display device to form a representation of the image that is rotated by a multiple of 90° relative to the first orientation. The rotated spatial data provided by the image processor module may then be displayed in a viewable form, for example, as a hardcopy (e.g., printed) image or as an electronic image on a display screen such as a television monitor, PDA or cell phone display, etc.

Figure 2:
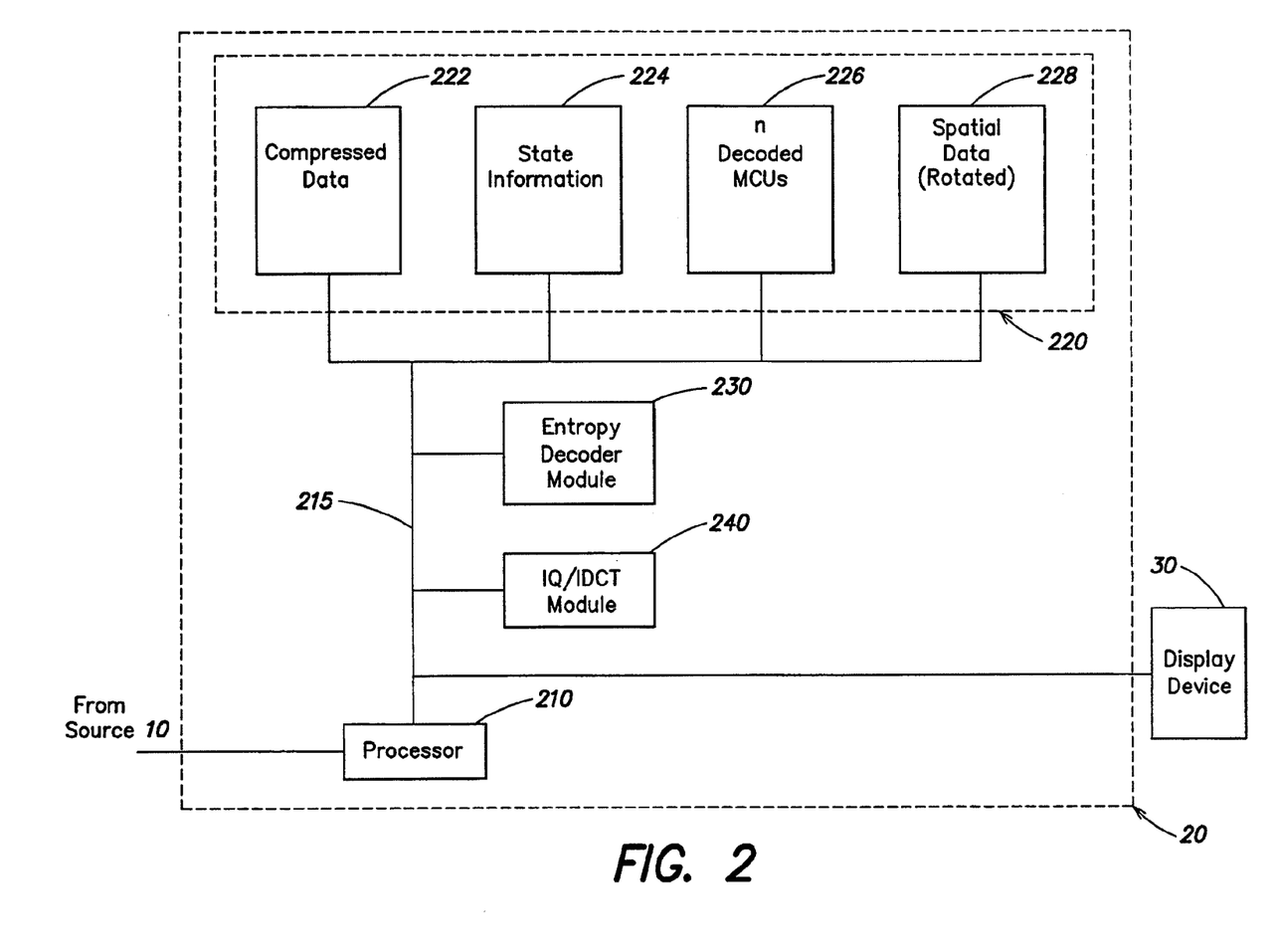
FIG. 2 is a block diagram representation of image processor module of FIG. 1.

FIG. 2 is a more detailed block diagram representation of the image processor module 20 of FIG. 1, in accordance with one embodiment of the present invention. As illustrated, the image processor module 20 includes a processor 210, a memory 220, an entropy decoder module 230, and an Inverse Quantization/Inverse Discrete Cosine transformation module 240 interconnected via a bus 215. The processor may, for example, be a general purpose processor such as those based on Intel PENTIUM-type processors, Motorola PowerPC processors, Sun UltraSPARC processor, or Hewlett-Packard PA-RISC processors; a Digital Signal Processor (DSP) available from companies such as Analog Devices, Motorola, or Texas Instruments; or an embedded control processor such as a Motorola 68000 family processor or an Intel i960 family processor. It should be appreciated that the type of processor (e.g., CISC, RISC, general-purpose, superscalar, DSP, etc.) and the capabilities of that processor may vary depending on the type of image processing system in which the processor 210 is used, as the present invention is not limited to any specific processor.

The memory 220 generally includes a combination of RAM memory and ROM memory (although only RAM memory is shown), but may also include other types of memory, such as flash memory, disk-based memory, tape memory, etc. As depicted in FIG. 2, the RAM memory 220 may include a number of different memory portions 222-228 that are used to store different types of data used by the processor 210. For example, in accordance with one embodiment, the memory 220 may include a memory portion 222 that is used to temporarily store compressed JPEG image data received from source 10 (FIG. 1) prior to being operated on by the processor 210. The memory 220 also includes a memory portion 224 that is used to store state information pertaining to some or all of the MCUs corresponding to the compressed JPEG image. Although described in more detail below, in broad overview, the state information stored in memory portion 224 enables the processor 210 to locate, decode, and decompress selected MCUs present in the compressed JPEG image data in an order other than the order in which they were compressed. The memory 220 may also include a memory portion 226 that may be used to store decoded MCU coefficient data corresponding to a subset of the MCUs contained in the compressed JPEG image, and a memory portion 228 that may be used to store fully decompressed and rotated spatial data prior to being provided to the display device 30.

In addition to the foregoing, the image processor module 20 also includes an entropy decoder module 230 and an Inverse Quantization/Inverse Discrete Cosine transformation module 240 (hereinafter an IQ/IDCT module). The entropy decoder module 230 receives arithmetic or Huffman encoded JPEG compressed image data and decodes that data to provide decoded MCU coefficient data. The entropy decoder module 230 may be a stand-alone module that is implemented in hardware and/or software, or alternatively, may be a software entropy decoding routine that may be executed by the processor. The IQ/IDCT module 240 receives decoded component coefficient data corresponding to MCUs of the compressed JPEG image, rotates that coefficient data in the transform domain by inverting and transposing coefficient values, inverse quantizes those coefficient values, and performs an inverse DCT on the dequantized coefficient values to produce rotated spatial data. As with the entropy decoder module 230, the IQ/IDCT module 240 may be implemented in hardware and/or software as a stand-alone module, or may alternatively be implemented in software in the form of a routine that may be executed by the processor 210.

Before describing further aspects of the construction and operation of the image processor module 20, FIGS. 3-6 are now described to provide a conceptual frame-work of the present invention.

Figure 3:
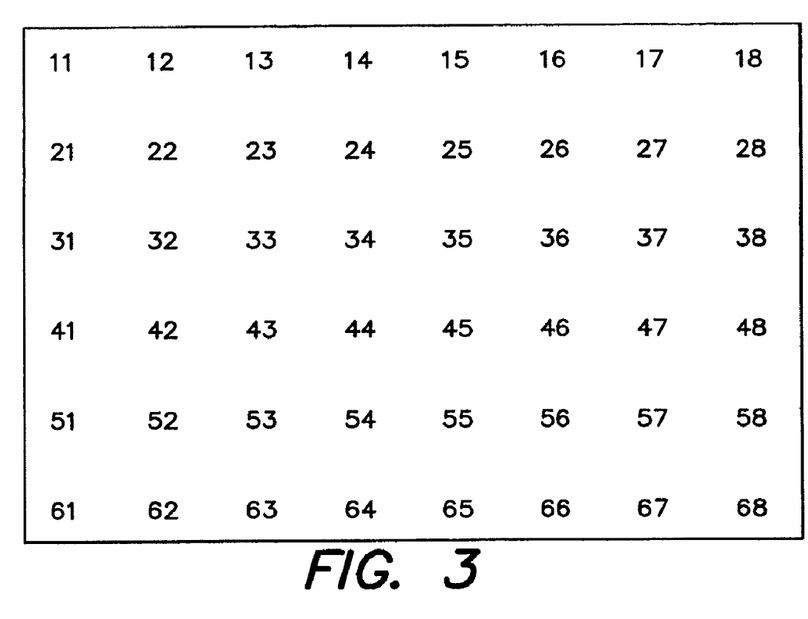
FIG. 3 is a graphical representation of an image in a first orientation that is divided into a number of sampled blocks of data.
Figure 4:
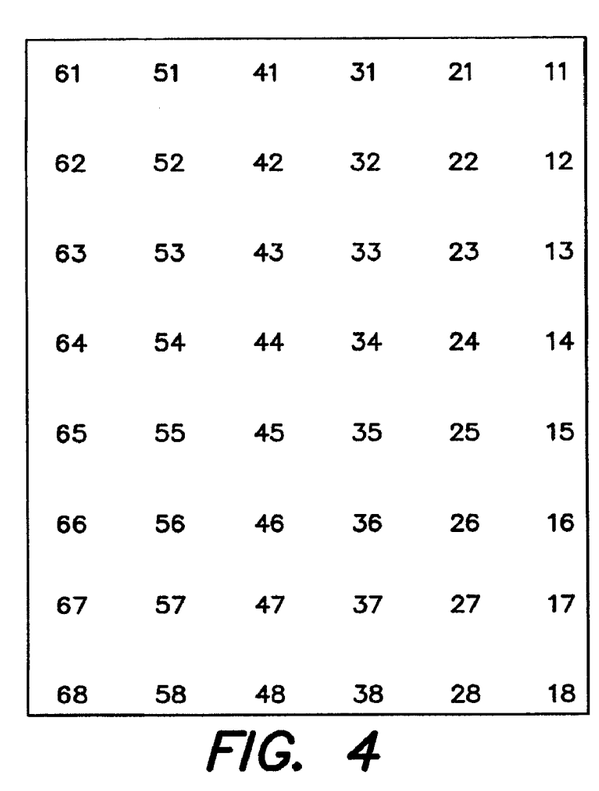
FIG. 4 is a graphical representation of the image of FIG. 3 in a second orientation that is rotated 90 degrees clockwise relative to the first orientation.

FIG. 3 is a graphical representation of an image in a first orientation in which portions of the image are divided into a number of segments. As shown, the image of FIG. 3 includes 48 segments, each segment corresponding to a sampled portion of the image (in the spatial domain) that is eight (8) pixels wide by eight (8) pixels in length. FIG. 4 illustrates the image of FIG. 3 rotated by 90° clockwise. As can be seen, the first row of 8 by 8 sampled image data in FIG. 3 (i.e., segments 11-18) will become the last column of image data in the rotated image of FIG. 4. Similarly, the first column of 8 by 8 sampled image data in FIG. 3 (i.e., segments 11-61) will become, in reverse order, the first row of sampled image data in the rotated image of FIG. 4. Thus, to produce the rotated image of FIG. 4, spatial data corresponding to each of the segments 11-68 would need to be rotated clockwise by 90°, and then sent to a display device in the order 61, 51, ... 11, 62, 52, ... 12, ... 68, 58, ... 18.

During a JPEG compression process of the image depicted in FIG. 3, the sampled segments of image data of FIG. 3 would be Discrete Cosine transformed, quantized, and entropy encoded from left to right and from top to bottom; that is starting with the top left of the image (segment 11) and ending with the bottom right of the image (segment 68). Assuming that component values for the sampled segments of the image depicted in FIG. 3 were sampled as a three component image with a horizontal sampling factor of 2 and a vertical sampling factor of 1 (e.g., H=2, V=1) for luminance (e.g., Y) values, and a horizontal sampling factor of 1 and a vertical sampling factor of 1 (e.g., H=1, V=1) for the blue (Cb) and red (Cr) chrominance values, and the 8 by 8 blocks of discrete cosine transformed and quantized component coefficient values encoded in the horizontally interleaved order illustrated in FIG. 5, then the first MCU (MCU1) of the JPEG compressed image would include four components (i.e., two luminance components Y1, Y2, and two chrominance components Cb1, Cr1) corresponding to segments 11 and 12. The second MCU (MCU2) would include four components (i.e., Y3, Y4, Cb2, Cr2) corresponding to segments 13 and 14, the fifth MCU (MCU5) would include four components (i.e., Y9, Y10, Cb5, Cr5) corresponding to segments 21 and 22, and the last MCU (MCU24) would include four components (Y47, Y48, Cb24, Cr24) corresponding to segments 67 and 68.

Figure 5:
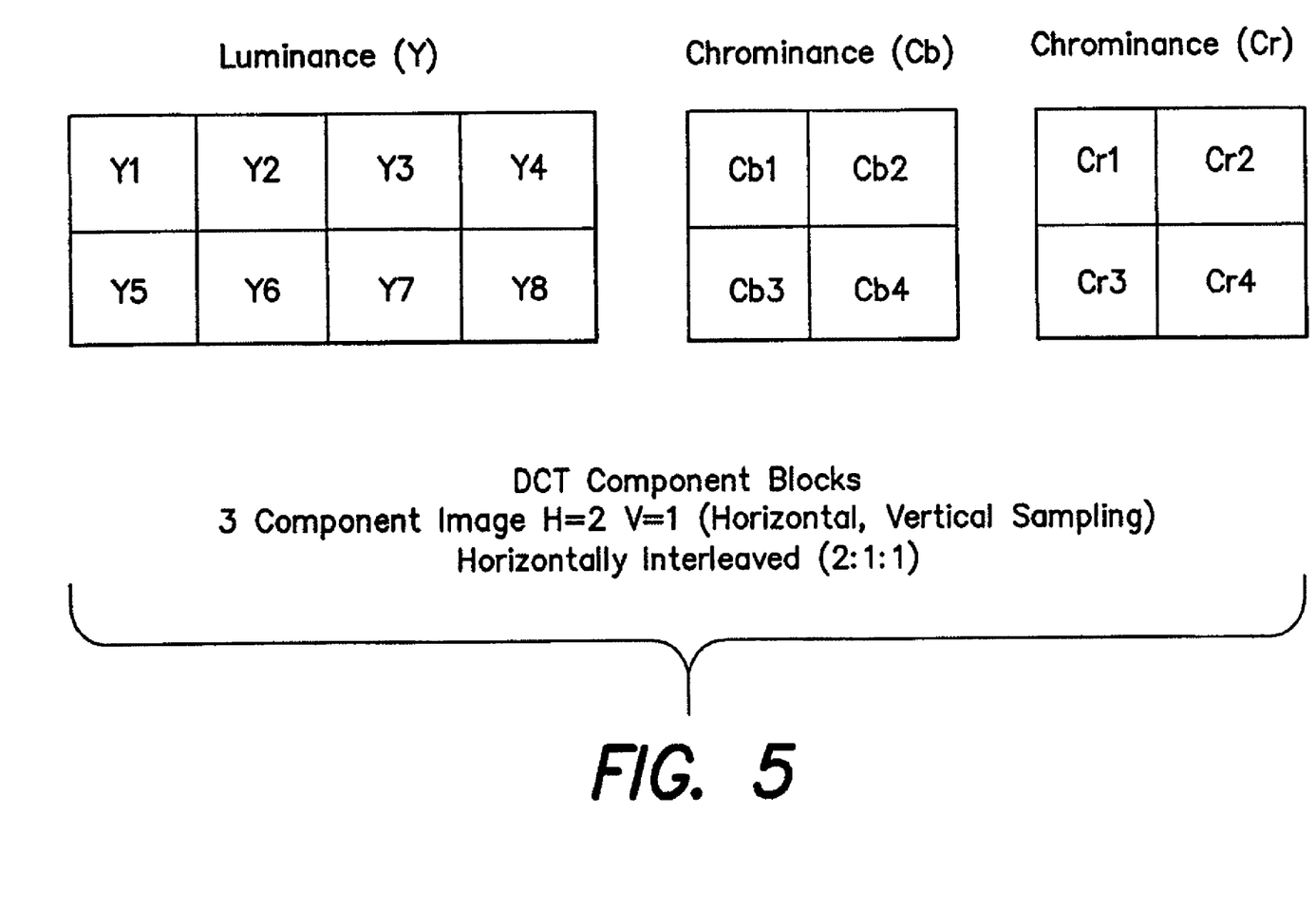
FIG. 5 graphically illustrates a portion of a three component image having twice as many luminance component blocks horizontally as chrominance component blocks.

To decompress the JPEG image compressed as described above, most conventional image processing systems would first process MCU1, then MCU2, then MCU3 . . . and finally MCU 24 in same sequential order in which they were compressed. This is typically because, for all but the first MCU, the DC coefficient value of each 8 by 8 block of quantized DCT coefficient values is differentially encoded relative to the corresponding DC coefficient value of the preceding 8 by 8 block of quantized DCT coefficient values for the same component. Thus, to fully decompress MCU2 (i.e., Y3, Y4, Cb2, Cr2), one would first need to know the DC coefficient values of Y2, Cb1, and Cr1 of MCU1. After decompression, the decompressed spatial image data would then typically be stored in a memory, where it could then be sent to a display device to display the image in the first orientation.

Were it desired to rotate the image depicted in FIG. 3 by a multiple of 90°, blocks of spatial data corresponding to the image would typically be rotated and reassembled in the appropriate order, and then stored in a memory prior to being sent to a display device to display the image in a second rotated orientation. Image processing systems that perform the rotation of an image or the rotation of portions of an image in the spatial domain are described, for example, in U.S. Pat. Nos. 5,986,672 and 6,271,929, and in published application number US2002/018238. Alternatively, rather than fully decompressing the JPEG image and performing rotation on the spatial domain data, some image processing systems, such as that described in the '598 patent, decode the MCUs of the compressed image in the same sequential order in which they were encoded, but perform rotation in the transform domain, rather than in the spatial domain.

In accordance with one aspect of the present invention, rather than decoding the MCUs of the compressed image in the same sequential order in which they were encoded, embodiments of the present invention decode the MCUs in a different order to provide an image that is rotated by a multiple of 90° relative the orientation in which the image was compressed. The order in which the MCUs are decoded will depend upon the amount of rotation (e.g., 90°, 180°, 270° (−90°)), the number of components in each MCU, and the manner in which those components were sampled during the compression process. In particular, embodiments of the present invention generally decode the MCUs of a compressed JPEG image in an order that corresponds to the order in which the spatial data would be sent to a display device so as to produce an image that is rotated by a multiple of 90° relative to its initial orientation.

For example, consider the image of FIG. 3 again sampled as a three component image with H=2 and V=1 for luminance values and with H=1 and V=1 for the blue (Cb) and red (Cr) chrominance values, and the 8 by 8 blocks of discrete cosine transformed and quantized component coefficient values encoded in the horizontally interleaved order illustrated in FIG. 5. Were it desired to decompress and rotate the compressed image 90° clockwise to provide the image depicted in FIG. 4, embodiments of the present invention would, for example, first decode MCU21 (corresponding to segments 61 and 62), then MCU17 (corresponding to segments 51 and 52), then MCU13 (corresponding to segments 41 and 42), then MCU9 (corresponding to segments 31 and 32), then MCU5 (corresponding to segments 21 and 22), and then MCU1 (corresponding to segments 11 and 12). The decoded 8 by 8 blocks of quantized DCT coefficient component values could then be provided, in the appropriate order, to the IQ/IDCT module 240 which rotates each of the blocks by transposing and inverting the quantized DCT coefficient values, and then inverse quantizes and inverse DCTs the inverted and transposed quantized DCT coefficient values. The spatial domain data provided by the IQ/IDCT module 240 may then be stored, in a buffer or memory such as memory 228, where it could then be provided to a display device, such as display device 30, to render the viewable image. Further portions of the image would be processed in a similar manner.

Figure 6:
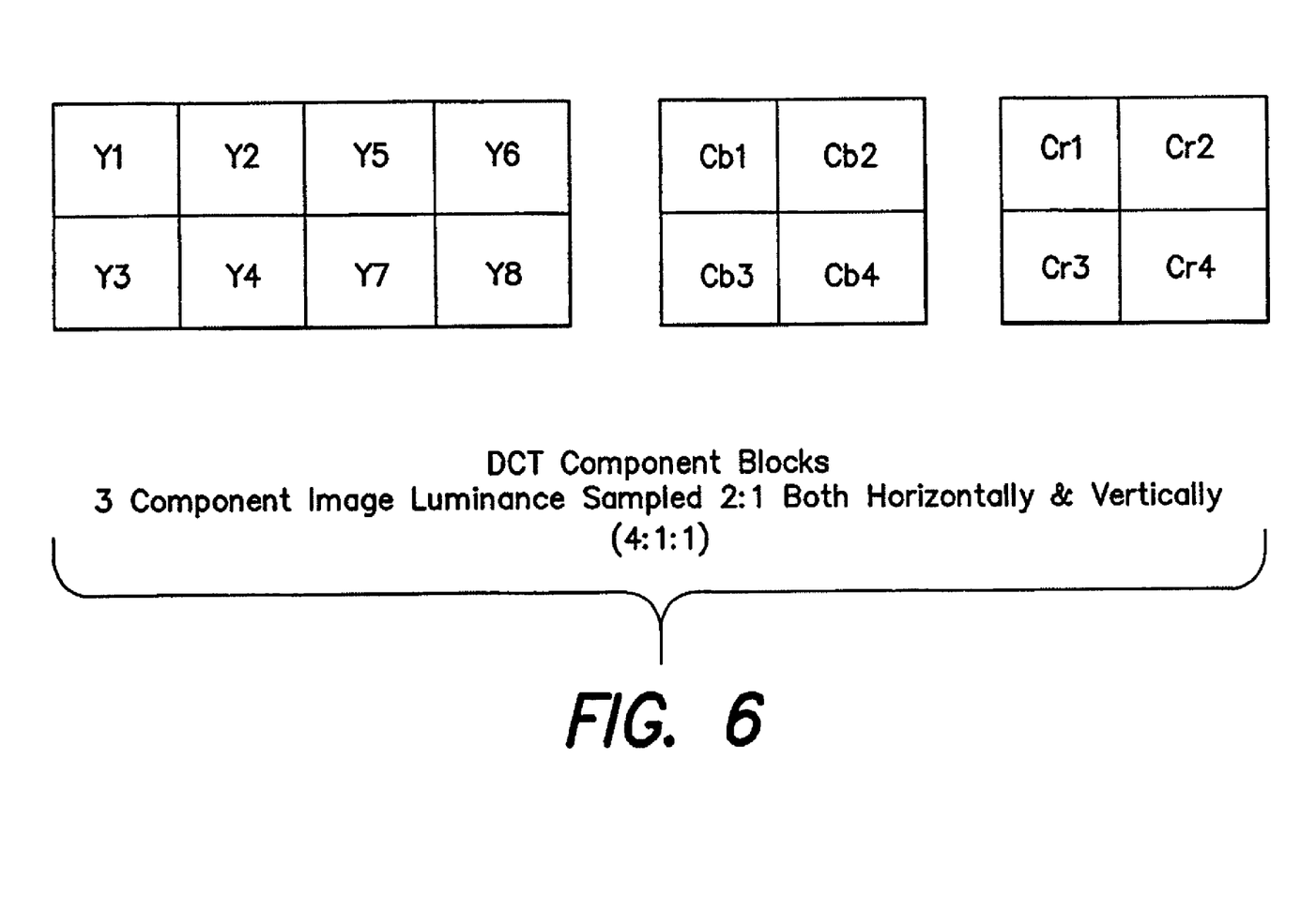
FIG. 6 graphically illustrates a portion of a three component image having twice as many luminance component blocks horizontally and vertically as chrominance component blocks.

Alternatively, if the component values for the sampled segments of the image depicted in FIG. 3 were sampled as a three component image with a horizontal sampling factor of 2 and a vertical sampling factor of 2 (e.g., H=2, V=2) for luminance (e.g., Y) values and a horizontal sampling factor of 1 and a vertical sampling factor of 1 (e.g., H=1, V=1) for the blue (Cb) and red (Cr) chrominance values, and the 8 by 8 blocks of discrete cosine transformed and quantized component coefficient values encoded in the horizontally interleaved order illustrated in FIG. 6, then the first MCU (MCU1) of the JPEG compressed image corresponding to FIG. 3 would include six components (i.e., four luminance components Y1, Y2, Y3, Y4 and two chrominance components Cb1, Cr1) corresponding to segments 11, 12, 21, and 22. The second MCU (MCU2) would include six components (i.e., Y5, Y6, Y7, Y8 Cb2, Cr2) corresponding to segments 13, 14, 23, and 24, the fifth MCU (MCU5) would include six components (i.e., Y17, Y18, Y19, Y20, Cb5, Cr5) corresponding to segments 31, 32, 41, and 42, and the last MCU (MCU12) would include six components (Y45, Y46, Y47, Y48, Cb12, Cr12) corresponding to segments 57, 58, 67, and 68.

To decompress the JPEG image compressed as described immediately above, most conventional image processing systems would again first process MCU1, then MCU2, then MCU3 . . . and finally MCU 12 in same sequential order in which they were encoded, again because of the predictive nature of the differential encoding. In contrast, embodiments of the present invention would, for example, first decode MCU9 (corresponding to segments 61, 51, 62, and 52), then MCU5 (corresponding to segments 41, 31, 42, and 32), and then MCU1 (corresponding to segments 21, 11, 22, and 12). The decoded 8 by 8 blocks of quantized DCT coefficient component values would then be provided, in the appropriate order (e.g., Y35, Y33, Y36, Y34, Cb9, Cr9; Y19, Y17, Y20, Y18, Cb5, Cr5; Y3, Y1, Y4, Y2, Cb1, Cr1), to the IQ/IDCT module 240 that rotates each of the blocks by transposing and inverting the quantized DCT coefficient values, and then inverse quantizes and inverse DCTs the inverted and transposed quantized DCT coefficient values to provide spatial domain data that may be temporarily stored in a memory or buffer prior to being provided to the display device 30.

So that the MCUs may be decoded in an order that is different than the order in which they were encoded, embodiments of the present invention store state information pertaining to each of the MCUs, or to certain ones of the MCUs, to enable MCUs to be located and then decompressed in an order other than that in which they were encoded. By storing such state information, embodiments of the present invention may decompress only a portion of the image at a time, send the fully decompressed portion to memory or a display device, and then decompress a next portion of the image while displaying the first portion. By decompressing only a portion of the image at a time, embodiments of the present invention minimize the amount of memory that needs to be provided to decompress and rotate a compressed JPEG image.

Figure 7:
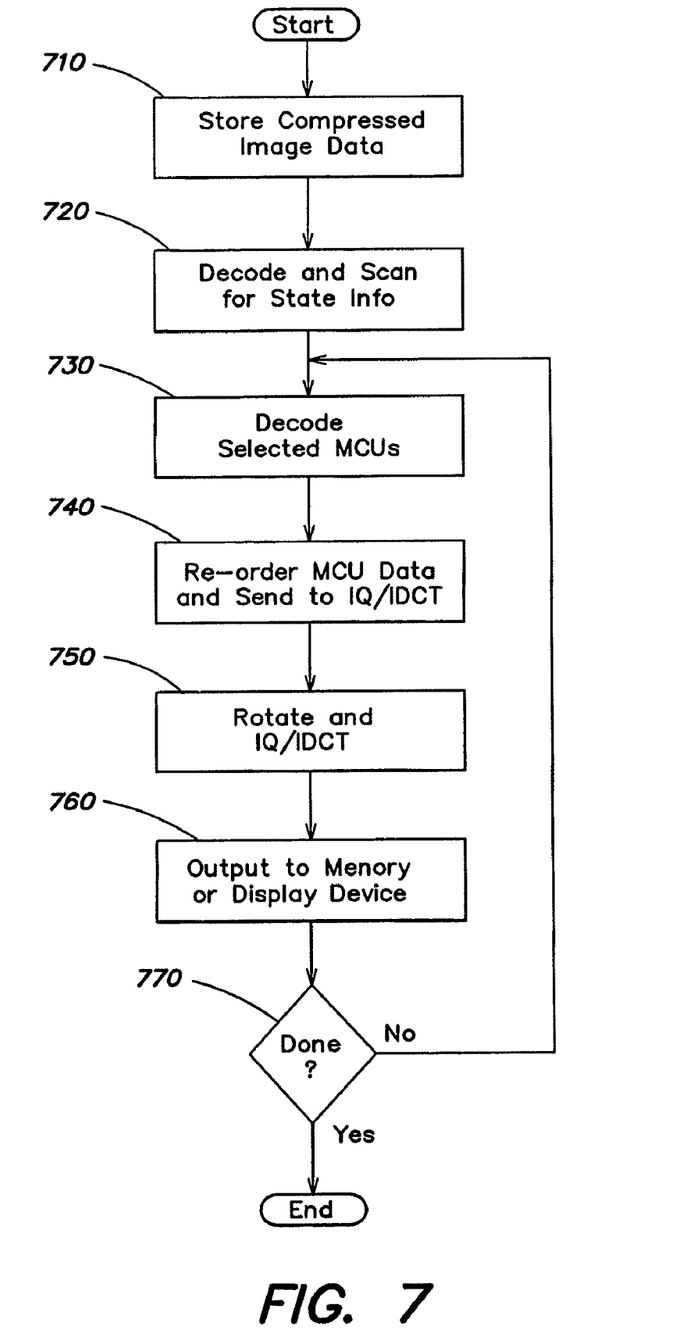
FIG. 7 is a flow chart illustrating an image processing routine in accordance with one exemplary embodiment of the present invention.

FIG. 7 is a flowchart illustrating an exemplary decompression routine that may be performed by the image processor 20 in accordance with one embodiment of the present invention. At step 710 the processor 210 receives a compressed JPEG image corresponding to an image that was compressed in a first orientation and stores the compressed JPEG image data in buffer, such as memory portion 222 (FIG. 2). The data that is stored in step 710 may include the header portions (e.g., information from the frame and or scan headers identifying the number and order of image components, quantization and encoding (entropy encoding or arithmetic encoding) tables, horizontal and vertical sampling factors, etc.) of the compressed JPEG image and the compressed image data, or simply the compressed image data itself.

At step 720, the processor 210 performs a first pass decoding of the compressed JPEG image data, and stores certain state information corresponding to the decoded MCUs in memory portion 224 (FIG. 2). In one embodiment, the state information that is stored in step 720 is stored for each MCU in the compressed JPEG image, although as will be discussed further below, the present invention is not so limited. The state information that is stored at step 720 includes a first identifier that identifies the byte location in memory portion 222 where the encoded MCU is stored, a second identifier that identifies the precise bit location, within the byte identified by the first identifier, in memory portion 222 where the encoded MCU is stored, and a third identifier that identifies the value of DC DCT coefficient for each 8 by 8 component block of luminance and chrominance DCT coefficient values.

In one embodiment, the first identifier may be 32 bits in length, the second identifier may be 8 bits in length, and the third identifier may be 16 bits in length for a total of less than 8 bytes for each MCU, although the present invention is not limited to any specific number of bits. Although an MCU may include more than one luminance and/or chrominance component in a single MCU, in one embodiment only the first DC luminance component (e.g., Y1) and the first chrominance components (e.g., Cb1 and Cr1) are stored, as the DC component of any other luminance or chrominance components may be determined therefrom. After decoding the MCUs and storing the state information, the decoded MCU is discarded, and the memory that was temporarily used to store the decoded MCU may be used to store another. It should be appreciated that if all of the MCUs in the JPEG compressed image were decoded and stored, then the amount of memory needed to store that information would be on the order of approximately 18 Mbytes for a 6 Megapixel color image compressed as a 4:1:1 image (i.e., 4 luminance components, and 2 chrominance components). This is in contrast to approximately 1.125 Mbytes of memory used to store the state information described above for each MCU in the same image.

After storing state information for each MCU of interest in step 720, the image processing routine proceeds to step 730, wherein the image processing routine decodes certain ones of the MCUs and stores the decoded MCU data (i.e., decoded 8 by 8 component blocks of quantized DCT coefficient data) in memory portion 226 (FIG. 2). In general, which MCUs are decoded at step 730 will depend upon the amount by which the image to be displayed is rotated relative to the original orientation used during compression. For example, using the example described previously with respect to FIGS. 3, 4, and 5 (e.g., a three component image with H=2, V=1 for luminance and H=1, V=1 for Cb and Cr), if it was desired that the image provided to the display device be rotated by 90° clockwise relative to the original orientation of FIG. 3, then the MCUs that would be decoded at step 730 would include, for example, MCUs 21, 17, 13, 9, 5, and 1 because these MCUs ultimately correspond to spatial data that would need to be provided to the display device prior to other portions of the image. Because the image processing routine knows (from the state information stored at step 720) the location in memory portion 222 where these MCUs are stored, and also knows the coefficient values of the DC components of these MCUs, the decoding performed at step 730 can be performed efficiently and independently of the decoding of other MCUs.

It should be appreciated that which MCUs are ultimately decoded at step 730 will depend, of course, on the particulars of the compressed JPEG image (e.g., the number of components, the sampling factors, etc.) and the amount of memory available for use by the image processing routine. In the present example, MCUs 21, 17, 13, 9, 5, and 1 correspond to 16 lines of spatial data, but depending on how much memory is available to store decoded MCU data, and how much memory was available for storing fully decompressed and rotated spatial data, other MCUs could be additionally decoded. For example, rather than decoding only MCUs 21, 17, 13, 9, 5, and 1 at step 730, MCUs 22, 18, 14, 10, 6, and 2 could additionally be decoded. Indeed, because the location of MCU 22 in memory portion 222 may be determined based upon the location of MCU 21, and because the DC component values of MCU 22 are predicted from those of MCU 21, MCU 22 may be decoded without saving any state information therefore. Thus, depending on memory requirements of the image processing system in which image processor 20 is used, embodiments of the present invention need not store state information corresponding to each MCU, but may do so for every other MCU, or every fourth MCU, etc.

After step 730, the image processing routine proceeds to step 740 wherein the 8 by 8 component blocks of quantized DCT coefficient values may be re-ordered and sent to the IQ/IDCT module 240. It should be appreciated that whether the 8 by 8 component blocks of quantized DCT coefficient values need to be reordered prior to being rotated and inverse quantized/inverse DCTd, and how those component blocks are reordered will depend upon the specific parameters of the JPEG compressed image data being processed. For example, in the first example described previously with respect to FIGS. 3, 4, and 5 (e.g., a three component image with H=2, V=1 for luminance and H=1, V=1 for Cb and Cr), no reordering may be necessary, whereas in the second example described previously with respect to FIGS. 3, 4, and 6 (e.g., a three component image with H=2, V=2 for luminance and H=1, V=1 for Cb and Cr), reordering of the component blocks would be needed (e.g., so that Y35 was ultimately sent to the display device 30 prior to Y33, etc.).

At step 750, the IQ/IDCT module 240 rotates the 8 by 8 component blocks of quantized DCT coefficient values in the transform domain by inverting and transposing quantized DCT coefficient values in a well known manner and then inverse quantizes and inverse DCTs those component values to provide spatial domain data that may be output directly to the display device 30 or to a memory location used to store spatial data (step 760), such as memory portion 228 (FIG. 2), prior to being provided to the display device 30. The inversion and transposition of 8 by 8 component blocks of quantized DCT coefficient values to effect rotation by 90°, 180°, and 270° is known to those skilled in the art, and is described, for example, in the aforementioned '598 and '653 patents which are herein incorporated by reference.

Accordingly, further details of effecting image rotation by the inversion and transposition of DCT coefficients is omitted herein.

After outputting the spatial domain data either to the display device 30 or to a memory location such as memory portion 228 in step 760, the image processing routine proceeds to step 770. At step 770 a determination is made as to whether there is further compressed JPEG image data that needs to be processed. Where there is no further compressed JPEG image data corresponding to the current image to be processed, the routine terminates. Alternatively, where there is additional compressed JPEG image data corresponding to the image being currently processed, the routine proceeds to step 730 wherein additional MCUs are decoded, re-ordered (if necessary), rotated, inverse quantized/inverse DCTd, and output to the display device 30 or to a memory location. For example, in the first example discussed previously (i.e., with respect to FIGS. 3, 4, and 5), after processing MCUs 21, 17, 13, 9, 5, and 1 and sending the corresponding spatial data either to the display device 30 or to a memory location, MCUs 22, 18, 14, 10, 6, and 2 might be processed. While MCUs 22, 18, 14, 10, 6, and 2 were being processed, the spatial data corresponding to MCUs 21, 17, 13, 9, 5, and 1 could be transferred, for example, by a DMA controller (not shown) from memory portion 228 to an input buffer of the output device, to reduce overall memory requirements. That is, the image processing system could be decoding, rotating, and decompressing one portion of the compressed JPEG image while a prior portion was being provided to the output device 30. Although such a band processing technique would be difficult to perform in a conventional image processing system due to the rotation of the output image, the stored state information permits MCUs to be processed independently of one another, such that those MCUs corresponding to a portion of the rotated image may be located and selectively decoded in an order other than which they were encoded.

As noted previously, the storing of state information in step 720 and the decoding of certain MCUs in step 730 may vary dependent upon the particulars of the compressed JPEG image and the amount of memory available for use by the image processing routine. For example, it should be appreciated that in step 720, the state information that is stored need not be stored for each MCU, as it may alternatively be stored for every other MCU, or every fourth MCU, etc. Similarly, the number of MCUs decoded in step 730 may be varied dependent on the amount of memory available to store the decoded MCU data.

It should be appreciated that embodiments of the present invention permit compressed JPEG data corresponding to a representation of an image in a first orientation to be decompressed and displayed in a second orientation that is rotated by a multiple of 90° relative to the first orientation using substantially less memory than that which would be required were the entire image fully decompressed in either its original orientation or the rotated orientation. For example, as discussed previously, a 6 Megapixel color image compressed as a 4:1:1 image (i.e., 4 luminance components, and 2 chrominance components) would require approximately 18 Mbytes to the entire decompressed image, whereas only approximately 1.125 Mbytes of memory would be needed to store state information for the same image. To consider a more extreme example, a non-sub-sampled 18 Mbyte JPEG compressed image would require approximately 54 Mbytes to store the entire decompressed image, whereas only approximately to 3 Mbytes would be needed to store state information for the same image. Because the amount of memory required to decompress and rotate a JPEG compressed image is substantially less than that required to decompress and rotate that image in a conventional manner, embodiments of the present invention are well suited for use in applications in which the cost, size, and/or power requirements, etc. of memory is a concern, such as in PDAs, cell phones, printers, etc.

Embodiments of the present invention may be implemented in hardware, software, or a combination of hardware and software. For example, in one embodiment, the decoding of MCUs and the generation and storing of state information pertaining to the decoded MCUs may be implemented in an Application Specific Integrated Circuit (ASIC) that interfaces with a more general purpose processor, such as processor 210 of FIG. 2. The ASIC may include its own processor that is configured to receive information, such as a pointer, identifying where compressed JPEG data corresponding to a representation of an image in a first orientation is stored (e.g., in memory portion 222), to decode the compressed JPEG data, and to store the state information corresponding to each MCU, or to every Nth MCU in a memory (e.g., memory portion 224), which may be local to the ASIC. The state information could then be accessed by the processor 210 to process the MCUs independently of one another, such that those MCUs corresponding to one portion of the rotated image may be located and selectively decoded in an order other than which they were encoded.

Although embodiments of the present invention have been described primarily herein with respect to images compressed in accordance with the sequential DCT based mode (baseline mode) of the JPEG standard in which there is a single image component, or in which multiple components of the image are interleaved, aspects of the present invention may be adapted for use with non-interleaved components as well. Thus, aspects of the present invention may also be used be to decompress and rotate non-interleaved JPEG compressed images using an amount of memory that is still considerably less than that required using conventional methods. For example, state information may be stored for each MCU, or for every Nth MCU, in each of the separate scans that identifies the location in memory where the respective MCU is stored, and the value of the DC DCT coefficient corresponding to the scanned component. The MCUs of the different components corresponding to a certain portion of the rotated image could then be located, decoded, rotated, and inverse quantized and inverse DCTd, and the spatial data corresponding to each of the different components of that portion of the rotated image provided to the display device or stored in memory.

Although embodiments of the present invention have been described with respect to the decompression of compressed image data compressed in accordance with the JPEG standard, it should be understood that the present invention is not so limited. In this regard, other forms of encoding (i.e., other than arithmetic or Huffman encoding) may be supported, such as for example Run-length limited encoding. Similarly, although the decompression of JPEG compressed image data has been described, those skilled in the art will appreciate that aspects of the present invention are equally applicable to other types of compressed images, for example, to MPEG compressed images, to H.261 compressed images, etc.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. Apparatus for use in an image processing system, the apparatus comprising:

a memory that includes a plurality of memory portions including a first memory portion, a second memory portion, a third memory portion, and a fourth memory portion, the first memory portion being configured to store compressed data encoded in a first sequential order corresponding to a first representation of an image in a first orientation, the compressed data including a plurality of coded units;

a display device configured to display rotated spatial data corresponding to a second representation of the image in a second orientation that is rotated by a multiple of ninety degrees relative to the first orientation; and a processor, operatively coupled to the memory and the display device and adapted to:

receive each of the plurality of coded units, decode each of the plurality of coded units in the first sequential order, and for each respective Nth coded unit of the plurality of coded units, to store first information in the second memory portion that identifies a location in the first memory portion in which the respective Nth coded unit is stored;

decode a first subset of the plurality of coded units in a second sequential order that is different than the first sequential order and store the decoded first subset of the plurality of coded units in the third memory portion, the decoded first subset of the plurality of coded units corresponding to a first contiguous portion of the second representation of the image in the second orientation;

rotate, inverse quantize, and inverse discrete cosine transform the decoded first subset of the plurality of coded units and store rotated spatial data corresponding to each coded unit in the decoded first subset of coded units in the fourth memory portion;

decode a second subset of the plurality of coded units in the second sequential order and store the decoded second subset of the plurality of coded units in the third memory portion, the decoded second subset of the plurality of coded units corresponding to a second contiguous portion of the second representation of the image in the second orientation that is contiguous to the first contiguous portion; and provide, prior to decoding the second subset of the plurality of coded units, the rotated spatial data corresponding to each coded unit in the first subset of coded units to the display device;

wherein the memory is dimensioned to store less than all of the rotated spatial data corresponding to each coded unit in the plurality of coded units.

2. The apparatus of claim 1, wherein each of the plurality of coded units includes quantized DCT coefficient data corresponding to a plurality of components of the image, and wherein the processor is further adapted to store, for each respective Nth coded unit of the plurality of coded units, second information in the second memory portion that identifies a value of each DC DCT coefficient in the quantized DCT coefficient data of the respective Nth coded unit that corresponds to a distinct component of the plurality of components of the image.

3. The apparatus of claim 2, wherein N equals 1.

4. The apparatus of claim 2, wherein N equals 2.

5. The apparatus of claim 2, wherein N equals 4.

6. The apparatus of claim 2, wherein the image corresponds to a 6 Megapixel color image compressed as a 4:1:1 image, and wherein the memory is dimensioned to store less than approximately 18 Mbytes.

7. The apparatus of claim 2, wherein the image corresponds to a non-subsampled 18 Mbyte compressed JPEG compressed image, and wherein the memory is dimensioned to store less than approximately 54 Mbytes.

* * * * *